UNITED STATES PATENT OFFICE.

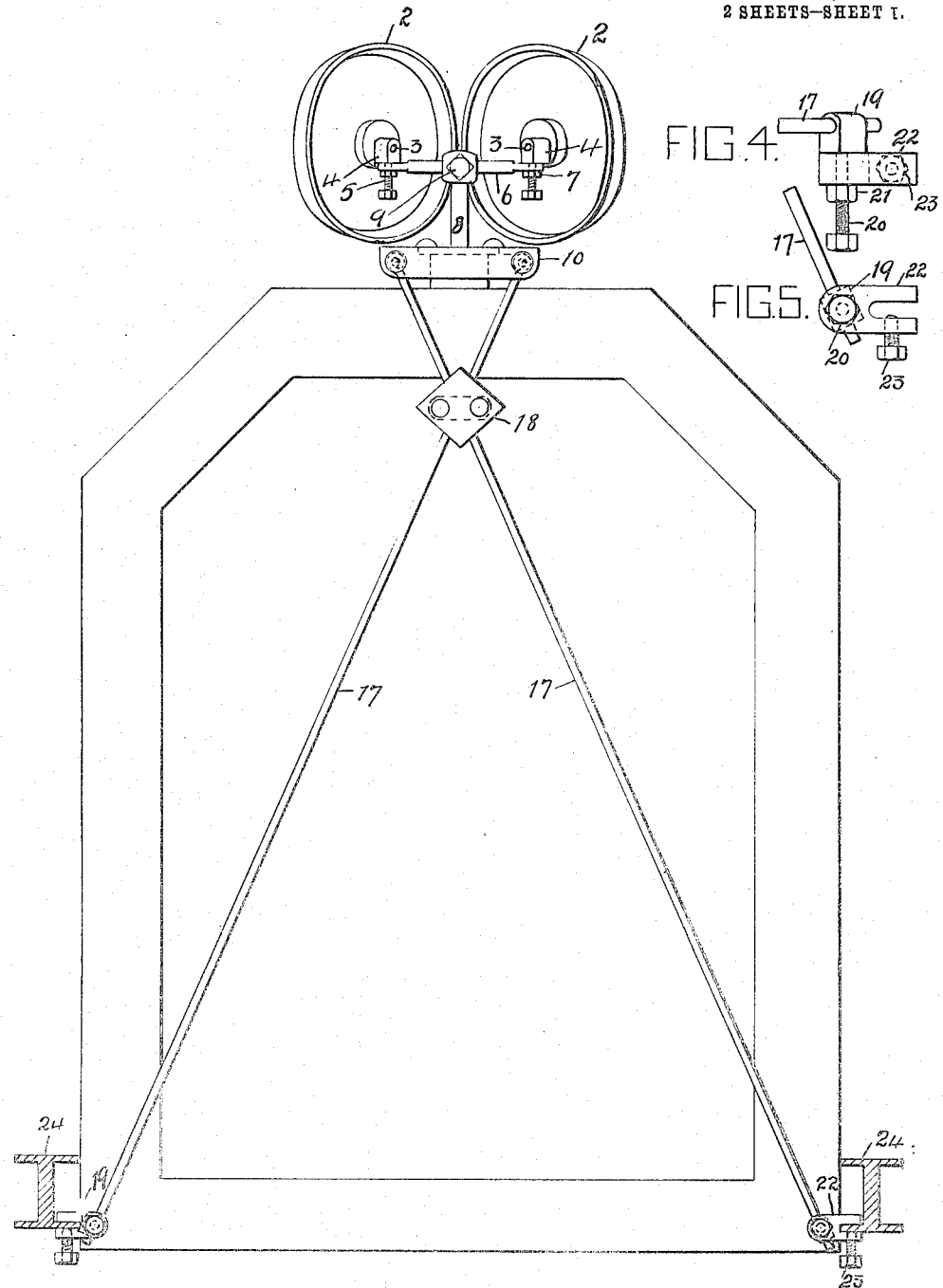

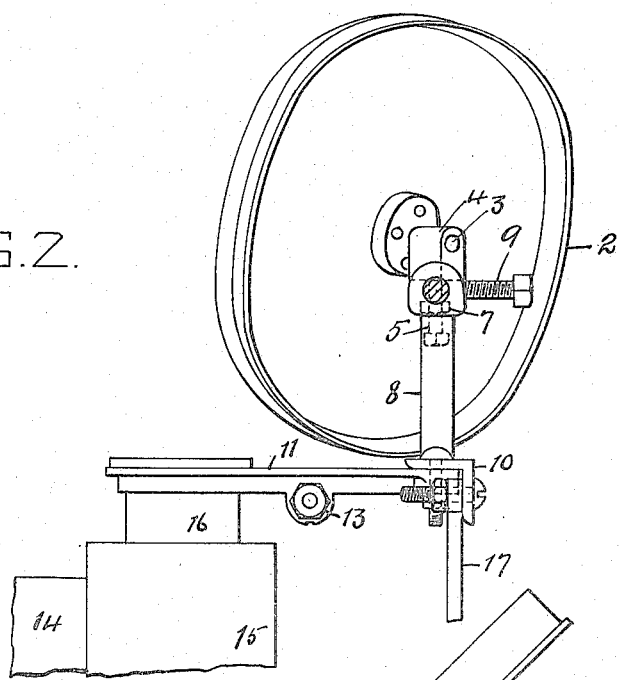
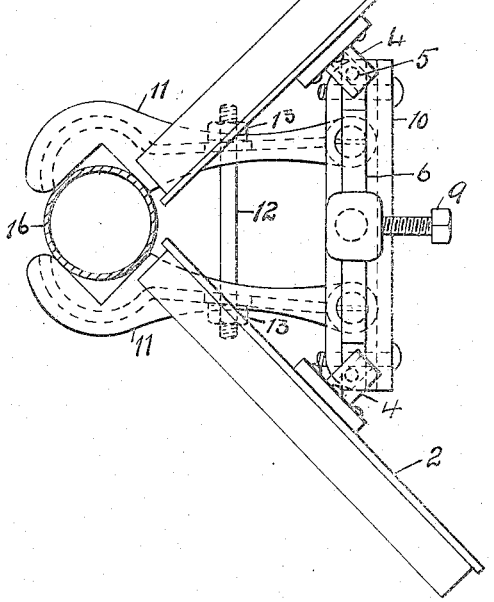

WILLIAM EDMUND FELLOWES, OF SWANSEA, ENGLAND.

REFLECTING DEVICE FOR MOTOR-VEHICLES.

1,135,446.

Specification of Letters Patent. Patented Apr. 13, 1915.

Application filed December 8, 1914. Serial No. 876,129.

*To all whom it may concern:*

Be it known that I, WILLIAM EDMUND FELLOWES, a subject of the King of Great Britain, residing at Swansea, England, have invented certain new and useful Improvements in Reflecting Devices for Motor-Vehicles; and I do hereby declare the following to be a full, clear, and exact description of the invention, such as will enable others skilled in the art to which it appertains to make and use the same.

The present invention relates to improvements in reflecting devices for use on the bonnets of motor vehicles which are arranged at such an angle as to enable the driver to see objects to the sides of the vehicle.

One object of the invention is to provide a device of this type which can be readily fixed to existing motorcars.

The second object of the invention is to provide a device in which the reflectors can be adjusted according to the relative position of the driver to enable him to see objects at right angles to the direction of travel of the car.

Another object is to provide a device in which the mirrors shall be easily adjustable to fulfil the object above described.

These devices are particularly useful when the motorcar passes into cross roads as they enable the driver to see up and down the cross road as soon as the bonnet or radiator of the vehicle passes on to the road and before the part of the vehicle containing the driver's seat and the rest of the vehicle has done so.

The invention will now be described with reference to the accompanying drawings in which:—

Figure 1 is a front elevation of a portion of a motorcar radiator showing the reflecting devices in position. Fig. 2 is a side elevation on an enlarged scale of a portion of Fig. 1 with one of the reflectors removed. Fig. 3 is a plan view of Fig. 2 with both reflectors in position. Figs. 4 and 5 are detail views on an enlarged scale of parts hereinafter referred to.

As shown in the drawings the mirrors 2 are each mounted by means of pins 3 in sockets 4 which by means of pins 5 are mounted in a cross bar 6, the pins passing through holes in the bar 6 and being locked therein by a suitable locknut 7. The cross bar 6 is carried by an upright or post 8 about its middle point being adjustably held therein by means of a suitable screw 9. The upright or post 8 is rigidly mounted on a short bracket 10 which is of angle cross section. To the underside of the bracket 10 there are adjustably hinged two jaws 11. The jaws are capable of being tightened up one toward the other by means of a bar 12 which is provided with a screw thread at each end over which nuts 13 take. The bonnet of the car to which the reflector is to be attached is represented at 14 and the radiator at 15 while the radiator inlet is indicated at 16. The jaws 11 take around the radiator inlet 16 being tightened up thereon by means of the rod 12 and the nuts 13. Also secured to the angle piece or bracket 10 are two stays 17 which cross one another being held together at their junction by a suitable plate and clamp 18. The lower ends of these rods 17 are held in sockets or eyelets 19 (see more particularly Figs. 4 and 5) which are held by means of screws 20 and locknuts 21 in clamps 22 which latter are capable of being secured by means of screws 23 to the side members or girders 24 of the chassis of the car.

From the foregoing description it will be seen that the device as a whole can be readily secured to practically all makes of car by simply securing the jaws in position and then adjusting the clamps 19 on the rods 17 and then securing these clamps to the girders 24 as shown.

It will be seen that the mirrors can each of them be swung individually about a vertical axis and unitedly about a horizontal axis so that when the driver is in his seat the mirrors can be tilted unitedly by permitting the cross piece 6 to be turned in the head of the post 8 till the mirrors reflect to the driver objects at the desired level. The mirrors can then be individually turned with the pins 5 in the cross piece 6 till they reflect objects at right angles to the path of travel of the motor after which they can be clamped in the adjusted position.

I claim:—

1. In a reflecting device for motorcars, two mirrors, supports holding said mirrors, means for adjusting said mirrors about a horizontal axis, means for adjusting said mirrors individually about a vertical axis, means for securing said supports to the front of the motorcar.

2. In a reflecting device for motorcars, two mirrors placed approximately at right angles the one to the other as regards their horizontal axes, a cross piece supporting said mirrors one toward each end, adjustable means permitting of turning said mirrors about a vertical axis connected to said cross piece, a post carrying said cross piece, means for permitting said cross piece to be turned about a horizontal axis in said post, means for securing said post to the front portion of a motorcar.

In testimony whereof, I affix my signature, in presence of two witnesses.

WILLIAM EDMUND FELLOWES.

Witnesses:
   WILLIAM D. SOCS,
   P. A. LIVINGSTON.